US005641186A

United States Patent [19]

Ross

[11] Patent Number: 5,641,186

[45] Date of Patent: Jun. 24, 1997

[54] LOCKING ASSEMBLY FOR DOOR PANEL

[76] Inventor: Damien Ross, 233 De L'Eglise, Rosemere, Quebec, Canada, J7A 2X1

[21] Appl. No.: 334,027

[22] Filed: Nov. 2, 1994

[30] Foreign Application Priority Data

Nov. 2, 1993 [GB] United Kingdom .................... 9322597

[51] Int. Cl.$^{6}$ ............................ E05C 19/12; F16B 45/00; E06B 3/48

[52] U.S. Cl. ............................ 292/114; 292/87; 292/95; 24/579.1; 160/118

[58] Field of Search .................................... 160/117, 118, 160/235, 231.2, 229.1; 49/483.1; 292/114, 80, 87, 96, DIG. 46, 95; 24/575, 579.1; 2/96, 128, 235

[56] References Cited

U.S. PATENT DOCUMENTS

| | | | |
|---|---|---|---|
| 1,711,340 | 4/1929 | Bricker | 49/483.1 |
| 2,713,897 | 7/1955 | Teague et al. | 160/117 |
| 3,350,752 | 11/1967 | Plummer | 24/576 |
| 3,971,580 | 7/1976 | Tantlinger et al. | 292/201 |
| 4,068,872 | 1/1978 | Smith | 292/87 |
| 5,099,904 | 3/1992 | Susnar | 160/229.1 |
| 5,224,247 | 7/1993 | Collier | 24/579.1 |

*Primary Examiner*—Steven N. Meyers
*Assistant Examiner*—Tuyet-Phuong Pham
*Attorney, Agent, or Firm*—Eric Fincham

[57] ABSTRACT

A locking arrangement is provided for releasably locking door panels made of flexible material. The locking arrangement is adapted to be used on door panels of conventional vehicle shelters. The locking arrangement comprises a pair of generally hook-shaped locking members attached to the inner peripheral edges of the door panels. The locking members have mutually engaging hooking sections. A resiliently biased portion of the door panel biases the hooking members away from each other, thus lockingly forcing the hooking sections against each other. The specific configuration of the locking members is adapted to prevent the members from being unlocked by external pressure caused by the wind blowing onto the exterior surface of the door panels. A pair of gripping apertures extending through the door panels adjacent the locking structures facilitate the handling of the locking assembly.

8 Claims, 2 Drawing Sheets

LOCKING ASSEMBLY FOR DOOR PANEL

BACKGROUND OF THE INVENTION

The present invention relates to the field of vehicle shelters made of flexible panels mounted on an internal frame, the frame being made of interconnected tubular members. The invention is particularly concerned with a locking arrangement for releasably locking a pair of door panels together in a closed position wherein the door panels prevent access to the interior of the shelter.

BACKGROUND OF THE PRIOR ART

Vehicle shelters have become increasingly popular in geographical regions wherein snowfalls are expected during the winter season. The vehicle shelters are particularly popular in suburban areas wherein a relatively large number of residences are provided with a driveway.

The vehicle shelters are adapted to form a protective enclosure over the driveways for preventing environmental elements such as snow, hail or the like from falling onto vehicles parked in the driveways.

The vehicle shelters are also often called "winter shelters" because they are typically assembled at the beginning of the winter season and disassembled at the end of the latter when snowfalls are no longer expected.

The conventional vehicle shelters typically consist of panels made of impervious and flexible material mounted over an internal frame structure made of interconnected tubular members. The conventional vehicle shelters typically have a front wall comprising a pair of flexible door panels suspended in a curtain-like manner on a transversal tubular member which is part of the frame structure.

The flexible door panels each have a substantially vertical inner peripheral edge. The door panels are adapted to slide sideways in an accordion like manner on the front wall transversal tubular member between an opened position wherein the respective door panel inner peripheral edges are in a spaced apart relationship relative to one another, thus allowing access to the interior of the shelter, and a closed position wherein the respective door panel inner peripheral edges are in a proximal relationship relative to each other, thus preventing access to the interior of the shelter.

The conventional vehicle shelters are provided with a conventional locking arrangement for releasably locking the flexible door panels in the closed position. One such conventional locking arrangement typically comprises a set of eyelets and a cord. The eyelets extend through the door panels and are disposed along the inner peripheral edges of the panels. In order to lock the door panels in the closed position, a user must lace the cord through the eyelets of both door panels, pull the peripheral edges of the door panels tight against each other and then fasten the cord to prevent separation of the peripheral edges.

The conventional door panel locking arrangement and method of using the same suffers from drawbacks. Firstly, the lacing operation that necessitates threading of the cord through the eyelets is both tedious and tiresome. Furthermore, this operation is rendered even more lengthy and tiresome in cold weather when the user must wear hand garment such as mittens or gloves.

Secondly, the conventional locking arrangement does not provide a seal-tight link between the door panel peripheral edges. Indeed, the segments of the peripheral edges positioned between the eyelets are subject to be deformed by wind pressure or otherwise. In such instance, the peripheral edges of the door panels have a tendency to separate from each other, thus forming gaps through which snow or other environmental elements may penetrate.

Thirdly, the eyelets create a localized stress concentration in the door panels that can potentially lead to the tearing of the latter if strong wind pressure is repeatedly applied to the door panels.

Fourthly, the puncturing and reinforcement of eyelets through both door panels requires a lengthy manufacturing process.

Fifthly, the presence of eyelets extending through the door panels and of the laced cord can be perceived as creating a non-esthetic visual effect.

SUMMARY OF THE INVENTION

Accordingly, it is an object of the present invention to provide an improved locking arrangement for vehicle shelter door panels.

It is a further object of the present invention to provide a locking arrangement for the door panels of a vehicle shelter to be locked and unlocked using a simple and ergonomical procedure.

It is a further object of the present invention to provide a locking arrangement which allows the door panels to be locked together along the entire length of their respective inner peripheral edges, thus minimizing the risk of snow or other environmental elements infiltration inside the shelter.

It is a still further object of the present invention to provide a locking arrangement that distributes the structural stress imparted on the door panels or membranes by wind pressure over a relatively large surface, thus reducing the risk of tear.

It is a still further object of the present invention to provide a locking arrangement wherein a pair of substantially identical locking members that can be manufactured using a relatively inexpensive manufacturing process commonly referred to as extrusion.

It is also an object of the present invention to provide a locking arrangement which can be considered to be visually esthetically pleasant.

In accordance with one embodiment of the present invention, there is provided a locking assembly which includes a first locking member adapted to cooperate with a substantially similar second locking member for releasably locking a door panel. The locking members are adapted for locking a peripheral edge of the door panel. Each locking member comprises a substantially elongated locking member body with the locking member body having a substantially "hook" shaped cross-sectional configuration with the hooking section itself having a substantially "V" shaped cross-sectional configuration.

The locking assembly can be utilized in several different manners. Thus, it can be used for locking a single door panel to an adjacent structure which is non moveable. Alternatively, it can be used for locking two moveable panels together and it is this preferred embodiment which will be described in greater detail hereinbelow although it will be understood that a single panel locking assembly may be employed.

The door panels may be formed in different configuration; the present invention is particularly directed to that type of structure which employs door panels of a flexible material which are suspended in a curtain like arrangement from a suitable support. However, other types of door panels could also employ the locking assembly of the present invention.

As above mentioned, in a preferred embodiment, the locking assembly has a first locking member adapted to cooperate with a substantially similar second locking member for releasably locking together a pair of suspended curtain like door panels. The door panels are preferably made of a substantially flexible material such that they can fold in an accordion like fashion and with each of the door panels having an outer peripheral side edge and an inner peripheral side edge. The locking members are adapted to be attached to the door panels adjacent the peripheral edges for locking adjacent inner peripheral edges together. Each locking member, in the preferred embodiment, has a substantially vertically elongated locking member body with means for attaching the locking member body to the inner peripheral edges of one of the door panels. Each locking member body has a substantially hooked shaped cross sectional configuration with a substantially flat spacing segment extending integrally from the attaching means and a hooking section extending integrally from the spacing segment. The hooking segment has a substantially "V" shaped cross-sectional configuration for reasons which will become apparent hereinbelow.

Preferably, the locking member body has a first surface and an opposed second surface and the hooking section further comprises a substantially flat hooking section longer segment. The hooking section longer segment has a longer segment proximal end and a longer segment distal end. There is a substantially flat hooking section shorter segment, with the hooking section shorter segment having a shorter segment proximal end and a shorter segment distal end. A substantially curved hooking section elbow segment is positioned intermediate the hooking section longer segment and the hooking section shorter segment with the longer segment proximal end extending integrally into the spacing segment. The longer segment distal end extends integrally into the hooking section elbow segment, the shorter segment proximal end also extending integrally into the hooking section elbow segment.

In the preferred embodiment, a locking protuberance extends integrally from the first surface adjacent the shorter segment distal end for reasons which will become apparent hereinbelow.

The attaching means may conveniently comprise a substantially elongated and tubular connecting section, the connecting section having a substantially parallelogram-shaped cross-sectional configuration and the connecting section defining an inner longitudinal channel extending therethrough.

Conveniently, the connecting section comprises a substantially flat connecting section first segment, the connecting section first segment having a first segment proximal end and a first segment distal end. The first segment distal end extends integrally and substantially co-linearly from the spacing segment, the connecting section also having a substantially flat connecting section second segment extending integrally and substantially perpendicularly from the locking member second surface adjacent the junction between the first segment distal end and the spacing segment. The connecting section second segment has a second segment proximal end and a second segment distal end, the second segment distal end merging integrally with the locking member second surface. The connecting section has a substantially flat connecting section third segment extending integrally and substantially perpendicularly from the connecting section second segment. The connecting section third segment has a third segment proximal end and a third segment distal end, the third segment distal end merging integrally with the second segment proximal end. The connecting section third segment is in a substantially parallel relationship with the connecting section first segment and the third segment proximal end is substantially in register with the first segment proximal end. The connecting section still further has a substantially flat connecting section fourth segment extending integrally and substantially perpendicularly from the connecting section third segment. The connecting section fourth segment has a fourth segment proximal end and a fourth segment distal end. The fourth segment distal end merging integrally with the third segment proximal end. The connecting section fourth segment is a substantially parallel relationship with the connecting section second segment, the fourth segment proximal end extending towards the first segment proximal end. The connecting section fourth segment is substantially shorter than the connecting section second segment and the fourth segment proximal end is thus spaced from the first segment proximal end by a segment spacing.

Preferably, the hooking section elbow segment is configured so that the first surface forms a substantially concave configuration, the hooking section shorter segment and the hooking section longer segment being angled relative to one another, the hooking section shorter segment and the hooking section longer segment forming a first bending angle, and also the hooking section longer segment and the spacing segment are angled relative to one another, the hooking section longer segment and the spacing segment defining a second bending angle, the second bending angle being configured so as to form a substantially concave configuration in the second surface.

According to one particular embodiment, the present invention proposes a locking arrangement or assembly for releasably locking together a pair of suspended curtain-like door panels which are made of a substantially flexible material, each of the door panels having an outer peripheral side edge and an inner peripheral side edge. A first one of the door panels has an extension pleat formed therein, the extension pleat extending substantially across the preselected door panel in a vertical direction substantially parallel to the inner peripheral side edge. The locking arrangement is adapted to lock the peripheral edges in a proximal relationship relative to each other, the locking arrangement comprising a pair of locking members, each of the locking members being adapted to be attached to one of the door panels adjacent the peripheral edges, each of the locking members comprising a substantially vertically elongated locking member body. An attaching means is provided for attaching the locking member body to the door panels. The locking member body has a substantially "hook" shaped cross-sectional configuration defining a substantially flat spacing segment extending integrally from the attaching means, with a hooking section extending integrally from the spacing segment, opposite the attaching means, the hooking section having a substantially "V" shaped cross-sectional configuration. A biasing means is provided for resiliently maintaining the extension pleat.

Conveniently, the biasing means may comprise a set of substantially elongated biasing strips, each of the biasing strips being made of somewhat stretchable or elastic material. Each of the biasing strips has a biasing strip first end and a biasing strip second end, the biasing strip first end and the biasing strip second end being fixed to the door panel on opposite sides of the extension pleat.

Preferably, the locking arrangement further comprises a gripping aperture extending through each of the door panels, the gripping aperture being positioned in contiguous relationship with the locking members so as to facilitate manual grasping for opening and closing.

The locking assembly of the present invention may be utilized in a door arrangement for a vehicle shelter, the vehicle shelter having an internal frame structure made of interconnected tubular members. The internal frame structure including a door transversal tubular member with the door arrangement comprising a pair of suspended curtain-like door panels, made of a substantially flexible material.

BRIEF DESCRIPTION OF THE DRAWINGS

An embodiment of the present invention will now be described, by way of example, in reference to the following drawings in which.

DETAILED DESCRIPTION OF THE INVENTION

Figure 1:
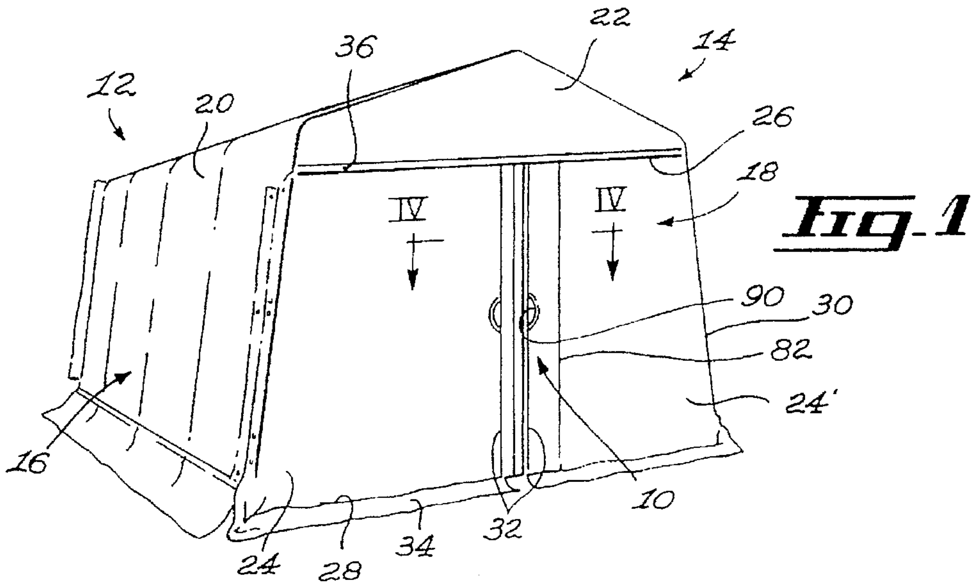
FIG. 1 is a perspective view, illustrating a locking arrangement in accordance with an embodiment of the present invention mounted on a conventional vehicle shelter.

Referring to FIG. 1, there is shown a locking arrangement or assembly 10 in accordance with an embodiment of the present invention mounted on a conventional vehicle shelter 12. The vehicle shelter 12 has a top wall 14, a pair of integrally extending side walls 16, a front wall 18 and a back wall (not shown). The vehicle shelter 12 has an internal frame structure (not shown). The internal frame structure is typically made of interconnected tubular members.

A set of wall panels made of substantially impervious and flexible material are mounted over the internal frame structure and attached to the latter. Typically, the top wall 14 and the side walls 16 are formed by an integrally extending first wall panel 20. The back wall is typically formed by a second wall panel. The front wall 18 typically has a front wall upper section and a front wall lower section. The front wall upper section is formed by a third wall panel 22.

The front wall lower section is formed by a pair of juxtaposed door panels 24 and 24'. The door panels 24 and 24' each have a door panel upper peripheral edge 26, a door panel lower peripheral edge 28, a door panel outer peripheral edge 30 and a door panel inner peripheral edge 32. A sealing flange 34 depends downwardly from each door panel lower peripheral edge 28.

A front wall transversal tubular member 36, part of the internal frame arrangement, extends across the front wall 18 between the front wall upper section and the front wall lower section. The door panels 24 and 24' are slidably attached to the front wall transversal tubular member 36 in a curtain-like fashion.

The door panels 24 and 24' are adapted to slide sideways in an accordion fashion on the front wall transversal tubular member 36 between an opened position wherein the door panel inner peripheral edges 32 are spaced apart, thus allowing access to the interior of the shelter 12 and a closed position wherein the door panel inner peripheral edges 32 are locked in a proximal relationship relative to each other, thus preventing access to the interior of the shelter 12.

The locking assembly 10 is adapted to releasably lock the door panels 24 and 24' in their closed configuration. The locking assembly 10 comprises a pair of substantially identical vertically elongated locking members 38. Each locking member 38 has a generally hook-shaped cross-sectional configuration. Each locking member 38 has a locking member first surface 40 and a locking member second surface 42.

Each locking member 38 has a hooking section 44, a spacing section 46 and a connecting section 48. Each hooking section 44 has a somewhat "V" shaped cross-sectional configuration. The hooking sections 44 have a substantially flat hooking section shorter segment 50, a substantially flat hooking section longer segment 54 and a substantially curved hooking section elbow segment 56 extending integrally between them.

The hooking section shorter segment 50 has a shorter segment proximal end and a shorter segment distal end. The shorter segment proximal end extends integrally into the hooking section elbow segment 56. A locking protuberance 58 extends integrally from the locking member first surface 40 adjacent the shorter segment distal end. The locking protuberance 58 has a substantially hemispherical cross-sectional configuration.

The hooking section elbow segment 56 has a bent configuration. The hooking section elbow segment 56 is configured so that the locking member first surface 40 forms a substantially concave configuration defined by the hooking section shorter segment 50 and the hooking section longer segment 54.

Figure 3:
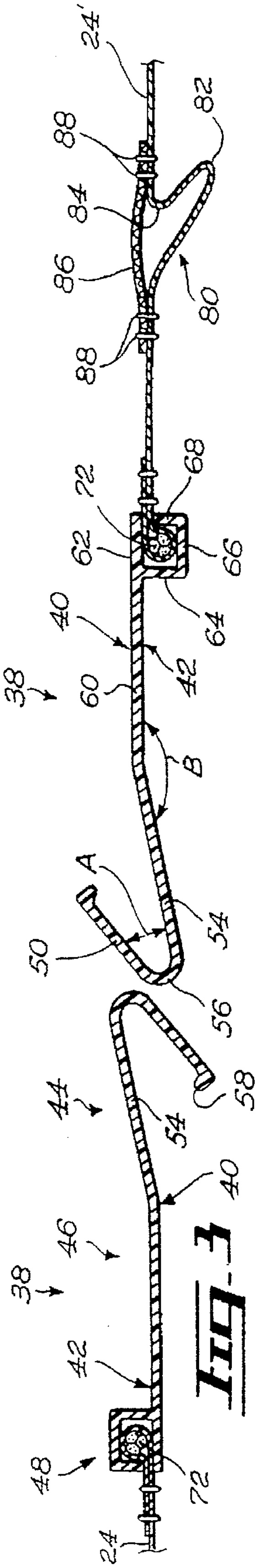
FIG. 3 is a partial cross-sectional view taken substantially along the location indicated by the arrows IV—IV of FIG. 1, illustrating a locking assembly in accordance with an embodiment of the present invention, the door panels of the vehicle shelter being in a closed but unlocked position.

The hooking section shorter segment 50 and the hooking section longer segment 54 are angled relative to one another by a first bending angle referred to in FIG. 3 by the reference character A.

The hooking section longer segment 54 has a longer segment proximal end and a longer segment distal end. The longer segment distal end extends integrally into the hooking section elbow segment 56 while the longer segment proximal end extends integrally into a substantially flat spacing segment 60 forming the spacing section 46.

The hooking section longer segment 54 and the spacing segment 60 are angled relative to one another by a second bending angle referred to in FIG. 3 by the reference character B. The second bending angle B is oriented so that the locking member second surface 42 forms a substantially concave configuration in the region of the hooking section longer segment 54 and of the spacing segment 60.

The connecting section 48 has a hollow and substantially parallelogram-shaped cross-sectional configuration defining an inner channel referred to by the reference letter C. The connecting section 48 has a substantially flat connecting section first segment 62. The connecting section first segment 62 has a first segment proximal end and a first segment distal end. The first segment distal end extends integrally and substantially co-linearly from the spacing segment 60.

The connecting section 48 also has a substantially flat connecting section second segment 64 extending integrally and substantially perpendicularly from the locking member second surface 42 adjacent the junction between the first segment distal end and the spacing segment 60. The connecting section second segment 64 has a second segment proximal end and a second segment distal end. The second segment distal end merges integrally with the locking member second surface 42.

The connecting section 48 further has a substantially flat connecting section third segment 66 extending integrally and substantially perpendicularly from the connecting section second segment 64. The connecting section third segment 66 has a third segment proximal end and a third segment distal end. The third segment distal end merges integrally with the second segment proximal end. The connecting section third segment 66 is in a substantially parallel relationship with the connecting section first segment 62. The third segment proximal end is substantially in register with the first segment proximal end.

The connecting section 48 still further has a substantially flat connecting section fourth segment 68 extending integrally and substantially perpendicularly from the connecting section third segment 66. The connecting section fourth segment 68 has a fourth segment proximal end and a fourth segment distal end. The fourth segment distal end merges integrally with the third segment proximal end. The connecting section fourth segment 68 is in a substantially parallel relationship with the connecting section second segment 64. The fourth segment proximal end extends towards the first segment proximal end. The connecting section fourth segment 68 is substantially shorter than the connecting section second segment 64. The fourth segment proximal end is thus spaced from the first segment proximal end by a segment spacing indicated in FIG. 5 and 6 by the reference character S.

The channels C defined by the connecting sections 48 are adapted to lockingly receive a corresponding enlarged locking portion 70 formed on the door panels 24 and 24'. The locking portions 70 are positioned adjacent the respective door panel inner peripheral edges 32.

Each locking portion 70 is formed by wrapping a corresponding door panel inner peripheral edge 32 around a piece of substantially elongated and flexible material such as a rope 72 and then fixing the door panel inner peripheral edge 32 to an adjacent door panel segment 74. A segment of the door panels 24 and 24' positioned adjacent the door panel peripheral edges 32 thus forms a loop which fittingly surrounds the rope 72. The door panel inner peripheral edge 32 is typically fixed to the adjacent door panel segment 74 using a pair of stitch lines 76. A knot 78 is tied at both longitudinal ends of the rope 72 to prevent longitudinal displacement of the latter.

Figure 6:
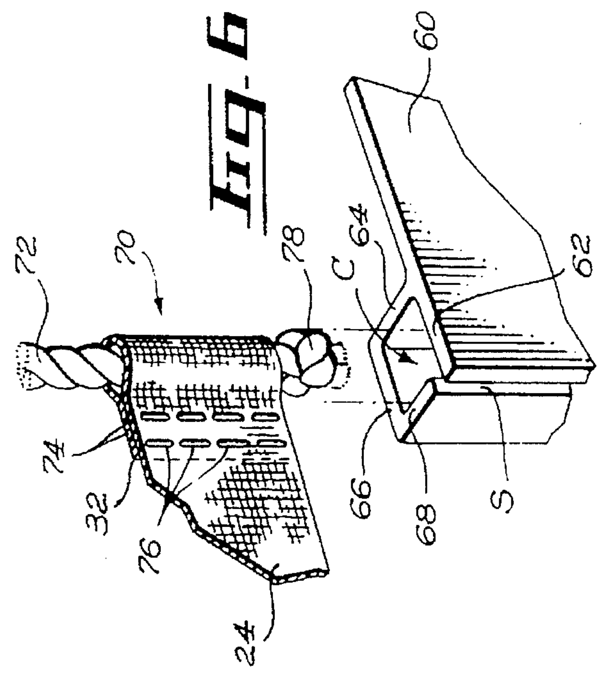
FIG. 6 is a partial perspective view, illustrating a connecting structure of a door panel about to be inserted into a connecting section part of a locking member, the locking member being part of a locking assembly in accordance with an embodiment of the present invention.

As illustrated more specifically in FIG. 6, the locking portions 70 are adapted to be slidably inserted in the channel C, with the door panel inner peripheral edge 32 and the adjacent door panel segment 74 protruding through the spacing S. The locking portions 70 and the connecting section 48 thus cooperate to act as an attaching means for releasably attaching the door panels 24 and 24' to a corresponding locking member 38.

The locking members 38 are attached to their respective door panels 24 and 24' in such a way that the locking member first surface 40 of the locking member attached to the door panel 24 is in a substantially facing relationship with the locking member first surface 40 of the locking member attached to the door panel 24' when the locking members 38 are releasably locked together as hereinafter described. In other words, the locking members 38 are attached so that one of the locking members 38 has its locking member first surface 40 facing the interior of the shelter 12 while the other locking member 38 has its locking member first surface 40 facing the exterior of the shelter 12.

The door panel 24' is provided with an extension pleat 80. The extension pleat 80 extends substantially vertically along the door panel 24', from its door panel upper peripheral edge 26 to its door panel lower peripheral edge 28. The extension pleat 80 is preferably positioned relative adjacent the locking portions 70. The extension pleat 80 is preferably formed by folding the door panel 24' about a pair of fold lines 82 and 84 so that the door panel 24' superposes itself in the region of the extension pleat 80.

The extension pleat 80 is sized so that when the door panels 24 and 24' are in a closed but unlocked position, as illustrated in FIG. 3, the elbow segments 56 of the respective locking members 38 are in a proximal relationship with one another.

A set of substantially elongated biasing strips 86 made of a somewhat elastic material such as rubber are fixed to the door panel 24'. Each biasing strip 86 has a biasing strip first end and a biasing strip second end. Each biasing strip 86 has its biasing strip first and second end fixed on opposite sides of the extension pleat 80. The biasing strip first and second ends are preferably fixed to the door panel 24' by a set of biasing strip stitch lines 88. The biasing strips 86 are in a substantially parallel and spaced apart relationship relative to one another. Typically, the biasing strips 86 are spaced vertically along the door panel 24' from the door panel upper peripheral edge 26 to the door panel lower peripheral edge 28.

A gripping recess 90 extends through both the door panels 24 and 24'. Each gripping recess 90 has a recess peripheral edge 92. The recess peripheral edges 92 have a substantially hemicircular configuration. The recess peripheral edges 92 are preferably covered with a protective hem fixed by a hem stitch pattern 94.

The specific configuration of the locking arrangement 10 allows the latter to be manufactured using a relatively inexpensive manufacturing process commonly referred to as extrusion. The locking arrangement 10 is preferably made of an extrudable polymeric resin such as polyvinyl chloride, adapted to withstand relatively low temperatures without loosing its structural properties.

Figure 2:
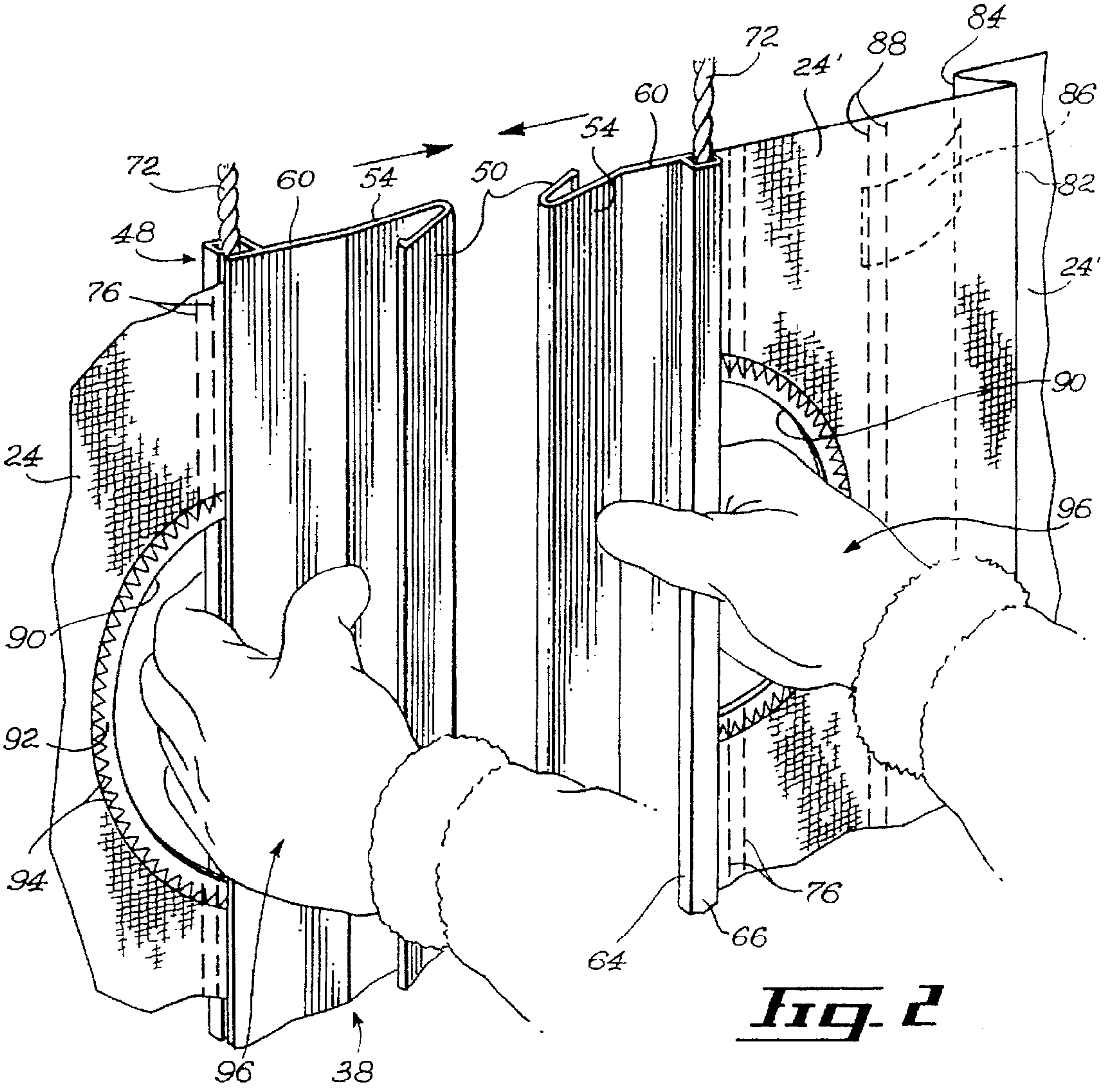
FIG. 2 is a partial perspective view, illustrating a pair of locking members part of a locking assembly in accordance with an embodiment of the present invention, the locking members are being pulled towards each other.

Typically, the various segments of the locking arrangement 10 all have a thickness substantially in the range of one eighth of an inch. As illustrated in FIG. 2, the spacing segment 60 is conveniently sized to facilitate gripping of the locking components 38. Typically, the spacing segment 60 has a width substantially in the range of one inch and a half. Typically, the first bending angle A has a value substantially in the range of 20°–40°. Typically, the second bending angle B has a value substantially in the range of 160°–175°.

In use, the locking arrangement 10 is adapted to be manipulated using simple and ergonomical maneuvers. Before locking the locking members 38 together, the door panels 24 and 24' are pulled sideways, causing the panels to slide on the front wall transversal tubular member 36. The door panels 24 and 24' are pulled until they reach a closed but unlocked position illustrated in FIG. 3, wherein the outer surfaces 42 of the locking members 38 about the respective elbow segments 56 are in a proximal relationship relative to each other.

To releasably lock together the locking members 38, as illustrated in FIG. 2, the hands 96 of the user are first partially inserted through the gripping recesses 90. Once the hands 96 are partially inserted, the user grasps the spacing segment 60. The user then pulls the locking members 38 sideways, towards each other, overcoming the biasing force created by the biasing strips 86.

The locking members are pulled sideways until the shorter segment distal end, part of the hooking section 44 of a given locking member 38 clears the shorter segment distal end, part of the hooking section 44 of the other locking member 38. The respective locking members 38 are then pushed slightly towards each other. In this position, the hooking sections 44 of the two locking members 38 are in an overriding relationship relative to each other.

Figure 4:
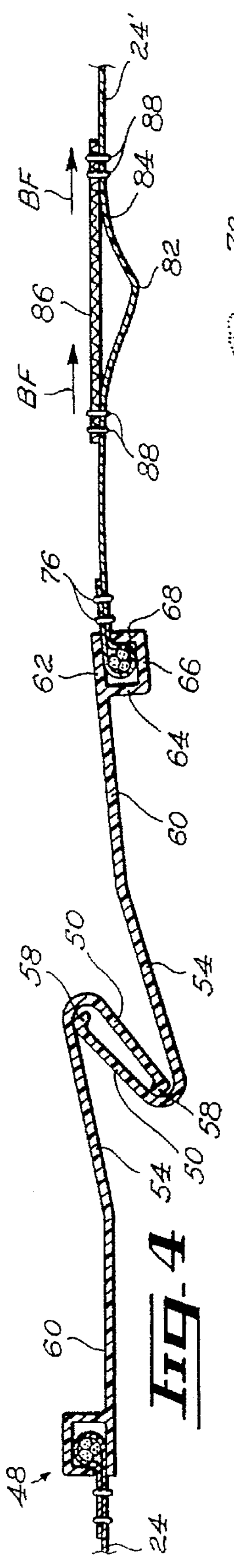
FIG. 4 is a partial cross-sectional view taken along arrows IV—IV of FIG. 1, illustrating a locking assembly in accordance with an embodiment of the present invention, the door panels of the vehicle shelter being in a closed and locked position.

The spacing segments 60 are then released by the user. The biasing force BF of the biasing strips 86 biases the locking member 38 that is attached to the door panel 24' away from the other locking member 38 causing the hooking members 38 to lockingly hook each other. As illustrated more specifically in FIG. 4, the shorter distal end part of the hooking section 44 of each locking member 38 is thus biased against the first surface of the opposite locking member 38 about the elbow segment 56.

Figure 5:
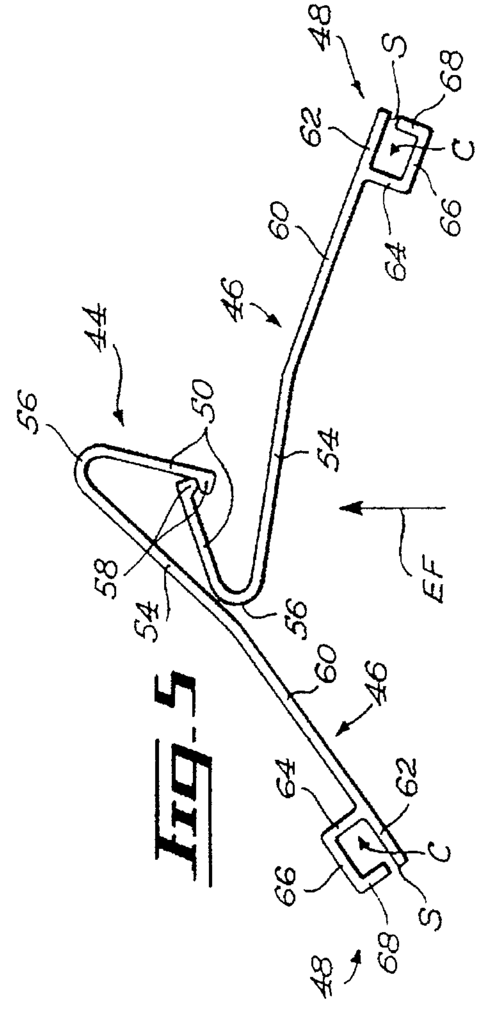
FIG. 5 is a top view, illustrating a pair of locking members being part of a locking assembly in accordance with an embodiment of the present invention, the locking members are shown unattached to the door panels, the locking members are also shown in a locked position and being biased rearwardly by an external force such as wind pressure.

Once the locking members 38 are locked together, their specific configuration prevents unwanted unlocking by external forces such as external pressure caused by the wind. FIG. 5 illustrates the relative positioning of a pair of locking members 38 after the application of an external force on the respective surfaces of the locking members 38 which face the exterior of the shelter 12. The external force is schematically symbolized by the arrow referred to by the reference characters EF.

The external force EF causes the locking members 38 to rotate relative to each other until they reach a fully rotated position illustrated in FIG. 5. In this fully rotated position, the second surface 42 of the elbow segment 56 of a first locking member 38 lockingly abuts against the first surface of the opposed locking member 38 about the hooking section longer segment 54, adjacent the connection of the latter with the spacing segment 60.

In the fully rotated position, the locking protuberances 58 of the respective locking members 38 also lockingly abut against each other. Further relative rotation of the locking members 38 is thus prevented. The geometric configuration of the hooking sections 44 consequently prevents unwanted unlocking of the locking members 38.

In order to unlock the locking members 38, the user merely needs to reverse the locking sequence of maneuvers. The hands 96 of the user are first partially inserted through the gripping recesses 90. Once the hands 96 are partially inserted, the user grasps the spacing segment 60 and the user then pulls the locking members 38 sideways, towards each other, overcoming the biasing force created by the biasing strips 86.

The locking members are pulled sideways until the shorter segment distal end, part of the hooking section 44 of a given locking member 38 clears the shorter segment distal end, part of the hooking section 44 of the other locking member 38. The respective locking members 38 are then pushed slightly away from each other. In this position, the hooking sections 44 of the two locking members 38 are in a spaced apart relationship relative to each other.

The spacing segments 60 are then released by the user. The biasing force BF of the biasing strips 86 biases the locking member 38 that is attached to the door panel 24' away from the other locking member 38, causing the hooking members 38 to move back to the unlocked position illustrated in FIG. 3.

It will be understood that the above described embodiment is for purposes of illustration only and that changes and modifications may be made thereto without departing from the spirit and scope of the invention.

I claim:

1. A door panel locking assembly for locking a door panel to a structure, said locking assembly comprising a resiliently biased door panel, first and second locking members, said first locking member being attached to an edge of said door panel, said second locking member being attached to said structure, each of said locking members comprising a hooking section, said hooking section including a substantially flat hooking section longer segment, said hooking section longer segment having a longer segment proximal end and a longer segment distal end, a substantially flat hooking section shorter segment, said hooking section shorter segment having a shorter segment proximal end and a shorter segment distal end, a substantially curved hooking section elbow segment, said hooking section elbow segment being positioned intermediate said hooking section longer segment and said hooking section shorter segment, said longer segment distal end extending integrally into said hooking section elbow segment, said shorter segment proximal end also extending integrally into said hooking section elbow segment, a locking protuberance extending integrally from said hooking section shorter segment adjacent said shorter segment distal end, said door panel having a resiliently biased portion to thereby permit said first locking member to be manually pulled to engage said second locking member and to maintain said locking members together.

2. The locking assembly of claim 1 wherein said resiliently biased portion comprises an extension pleat formed vertically in said panel, and a plurality of elongated biasing strips of an elastic material, each of the said biasing strips having a first end and a second end, said first and said second end being secured to said door panel on opposite sides of said extension pleat.

3. The locking assembly of claim 1 wherein said structure is a second door panel and said first locking member is attached to a vertically extending edge of said door panel.

4. The locking assembly of claim 3 further including a gripping aperture extending through each of said door panels.

5. A releasable locking system comprising first and second suspended curtain-like door panels, each of said door panels being made of a flexible material, each of said door panels having an outer peripheral side edge and an inner peripheral side edge, said first door panel having an extension pleat formed therein, said extension pleat extending substantially across said first door panel in a direction substantially parallel to said inner peripheral side edge adjacent the latter, a locking assembly comprising first and second locking members attached to said first and second door panels respectively adjacent said inner peripheral edges, each of said locking members comprising a means for attaching said locking member to its respective door panel, said locking member having a substantially hook-shaped cross-sectional configuration defining a substantially flat spacing segment extending integrally from said attaching means, a hooking section extending integrally from said spacing segment opposite said attaching means, said hooking section having a substantially V-shaped cross-sectional configuration, and a biasing means for resiliently maintaining said extension pleat.

6. A system as defined in claim 5 wherein said biasing means comprises a set of substantially elongated biasing strips, each of said biasing strips being made of elastic material, each of said biasing strip having a biasing strip first end and a biasing strip second end, said biasing strip first end and said biasing strip second end being secured to said first door panel on opposite sides of said extension pleat.

7. A system as defined in claim 6 further comprising a gripping aperture extending through each of said door panels, said gripping aperture being positioned in contiguous relationship with said locking members so as to facilitate manual gripping thereof.

8. A system as defined in claim 6 wherein each of said locking members has a first surface and an opposed second surface and wherein said hooking section further comprises a substantially flat hooking section longer segment, said hooking section longer segment have a longer segment proximal end and a longer segment distal end, a substantially flat hooking section shorter segment, said hooking section shorter segment having a shorter segment proximal end and a shorter segment distal end, a substantially curved hooking section elbow segment, said hooking section elbow segment being positioned intermediate said hooking section longer segment and said hooking section shorter segment, said long segment proximal end extending integrally into said spacing segment, said longer segment distal end extending integrally into said hooking section elbow segment, said shorter segment proximal end also extending integrally into said hooking section elbow segment.

* * * * *